United States Patent
McVaugh

(10) Patent No.: US 6,942,180 B2
(45) Date of Patent: Sep. 13, 2005

(54) STEERABLE DUAL WHEEL POWER TUG FOR AIRCRAFT

(75) Inventor: Arthur K. McVaugh, Green Lane, PA (US)

(73) Assignee: LittleStar Products, Inc., Machesney Park, IL (US)

( * ) Notice: Subject to any disclaimer, the term of this patent is extended or adjusted under 35 U.S.C. 154(b) by 161 days.

(21) Appl. No.: 10/636,175

(22) Filed: Aug. 7, 2003

(65) Prior Publication Data

US 2004/0094663 A1 May 20, 2004

Related U.S. Application Data

(63) Continuation-in-part of application No. 10/226,574, filed on Aug. 23, 2002, now Pat. No. 6,604,707, which is a continuation-in-part of application No. 10/034,314, filed on Dec. 26, 2001, now Pat. No. 6,536,709.

(51) Int. Cl.[7] .............................................. B64C 25/50
(52) U.S. Cl. .................................... 244/50; 180/19.2
(58) Field of Search .................... 244/50, 51, 114 R, 244/115; 180/19.2, 19.1, 19.3, 11, 12, 904

(56) References Cited

U.S. PATENT DOCUMENTS

| | | | | | |
|---|---|---|---|---|---|
| 2,920,845 | A | * | 1/1960 | Palmiter | 180/19.3 |
| 3,150,734 | A | * | 9/1964 | Duggar, Jr. | 180/11 |
| 3,662,911 | A | * | 5/1972 | Harman | 414/430 |
| 4,280,578 | A | * | 7/1981 | Perkins | 180/6.5 |
| 4,289,212 | A | * | 9/1981 | Immel | 180/19.1 |
| 4,915,185 | A | * | 4/1990 | Olson | 180/19.2 |
| 5,860,622 | A | * | 1/1999 | Weibert | 244/50 |

FOREIGN PATENT DOCUMENTS

| GB | 002193935 A | * | 2/1988 | ........... B62D/51/04 |
|---|---|---|---|---|

* cited by examiner

Primary Examiner—Peter M. Poon
Assistant Examiner—Timothy D. Collins
(74) Attorney, Agent, or Firm—John S. Munday

(57) ABSTRACT

A tug device for moving small aircraft having front wheels. A portable drill is connected to a drive wheel and a frame is attached to the wheel. The device is compact and easily assembled for use and disassembled for storage. The device includes a pair of drive wheels and is steerable when a locking latch is released. The locking latch provides rigidity to the device under load.

14 Claims, 18 Drawing Sheets

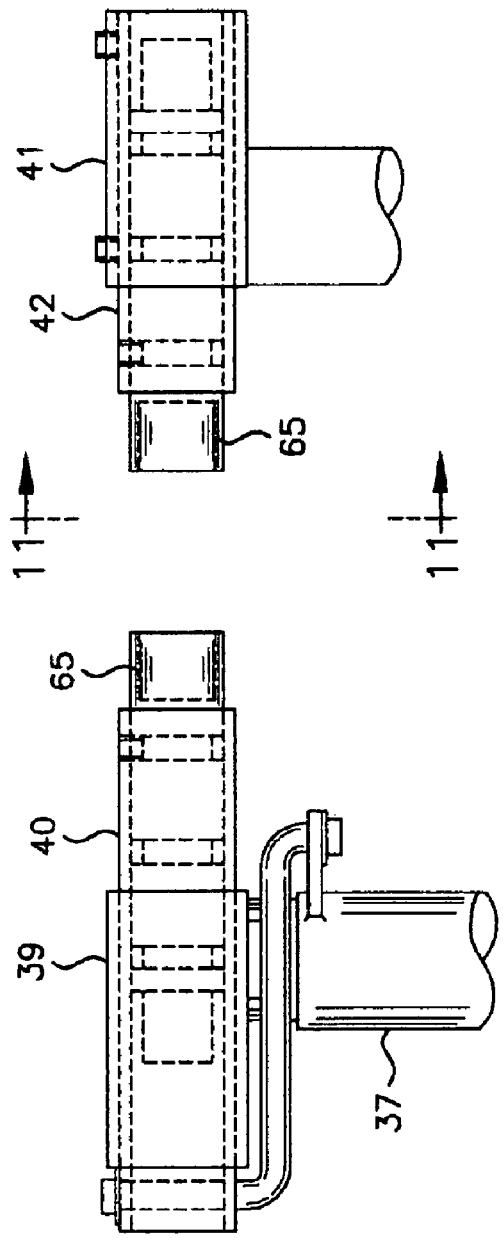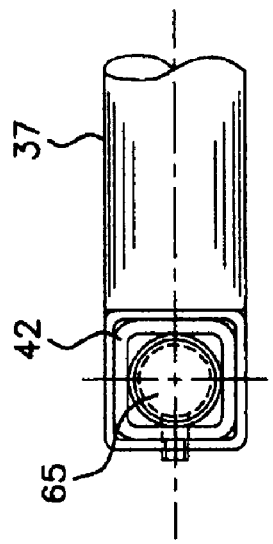

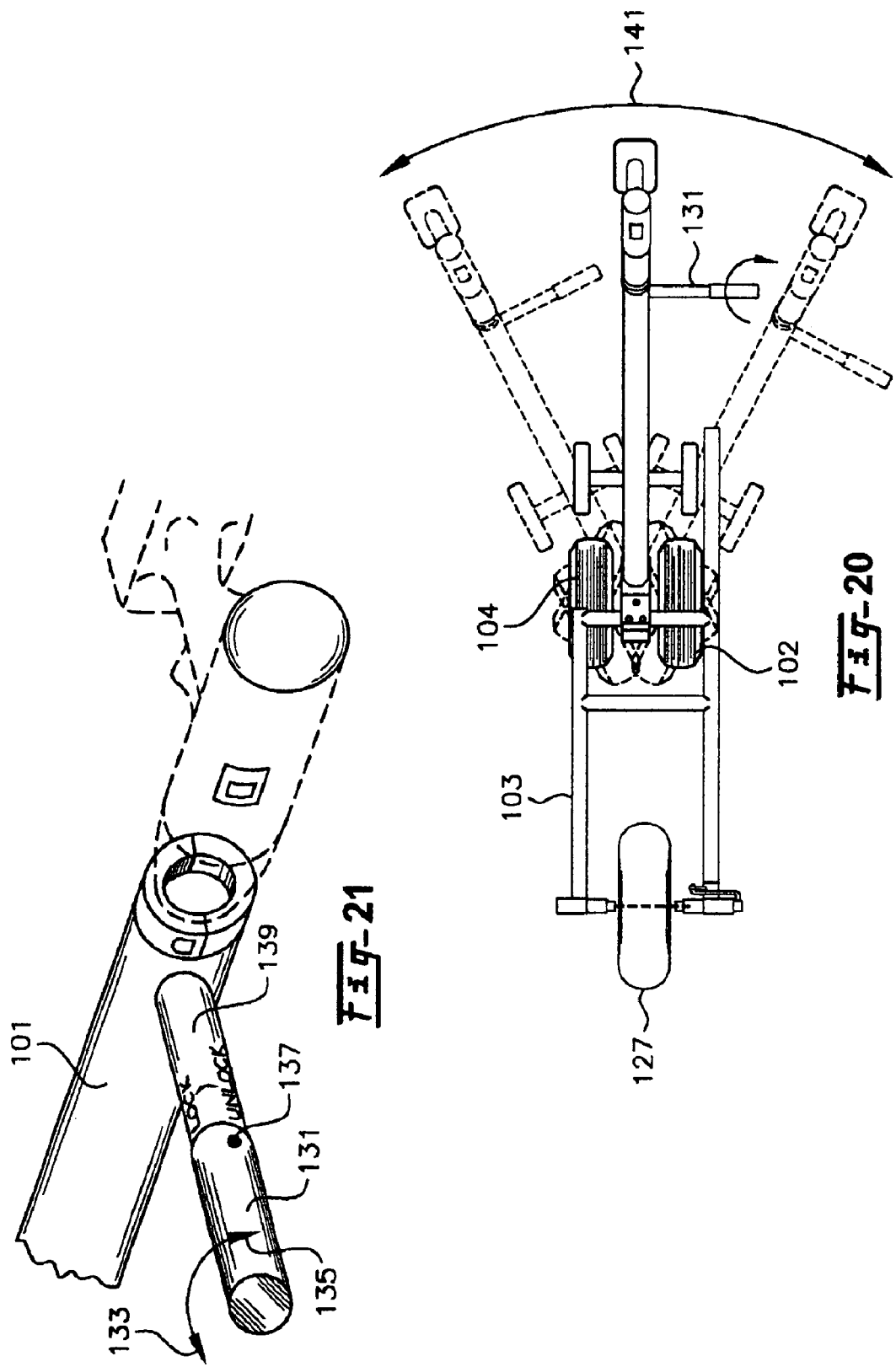

STEERABLE DUAL WHEEL POWER TUG FOR AIRCRAFT

This is a continuation-in-part of my prior application entitled STEERABLE POWER TUB FOR SMALL AIRCRAFT filed Aug. 23, 2002, now U.S. Pat. No. 6,604,787 having Ser. No. 10/226,574, which in turn is a continuation-in-part for my prior application entitled POWER TUB FOR SMALL AIRCRAFT filed Dec. 26, 2001, now U.S. Pat. No. 6,536,709, having Ser. No. 10/034,314.

FIELD OF THE INVENTION

The present invention relates to a power tug for moving aircraft at airports and the like. More particularly the present invention relates to a power tug using a commercially available portable electric drill to drive a gear and dual wheel assembly capable of rapid attachment to aircraft front wheel axles and nose struts. The present embodiment is steerable.

BACKGROUND OF THE INVENTION

Moving small aircraft on the ground is often necessary when the aircraft is serviced or taken to a hanger or brought out. In the past, the motor has been started and the aircraft's own power has moved it from one place to another. This, of course, presents a potential danger from the rotating propeller. It also produces unnecessary wear and stress on the motor when it is operated for just a short while.

As an alternative, aircraft tugs have been employed, much like the large tugs that move commercial jet aircraft and the like. However, this requires a significant investment in equipment costs for operating the tug. It also requires having someone available to operate the device and/or train small aircraft owners to use the machine.

It would be of great advantage if a simple, efficient device could be developed that would permit owners to move their own planes without worrying about safety concerns from the motor of the plane.

One such device has been proposed. Olson U.S. Pat. No. 4,915,185 discloses a portable aircraft moving device using a portable electric drill. The drill output shaft is linked to a worm gear to mount temporarily to the front wheel of the airplane above the airplane wheel. While the drawings of this patent are clearly not intended to be to scale, the size of the airplane and the operator distort the difficulties of moving aircraft that may weigh several thousand pounds. Olson requires a drive wheel in the device to engage the aircraft front wheel and use that wheel to push or pull the aircraft. One additional drawback of Olson is that it places frictional stress on the nose wheel. It is not adaptable to all aircraft, requiring a specific axle adapter for each make or model.

Other patents have also found use for portable electric drills. Hawgood U.S. Pat. No. 4,156,315 discloses a dolly for maneuvering trailers, again using a worm gear.

Perkins U.S. Pat. No. 4,280,578 teaches the use of an electric drill for a walker for the disabled, a far less substantial weight and effort than aircraft. Perkins also uses a worm gear arrangement.

Finally, Hurt U.S. Pat. No. 3,713,501 employs an electric drill to alternatively move a belt to elevate the hand truck up or down stairs or move the wheel axle of the hand truck on flat ground. None of these other devices suggest a simple, effective method for moving small aircraft without frictional engagement with the nose wheel of the aircraft, and without having separate fittings for each make or model of the plane being moved.

In my earlier continuation-in-part application, a solution to the problems of the prior are is described and claimed. In my newer copending application, the design was modified to make the device steerable, producing substantial advantages including the ability to move much heavier aircraft because of the steerable features. In this application, the tug design is improved to make it transportable without major assembly or the use of tool. It also has a much higher capacity and has an improved steering option.

Other advantages will appear hereinafter.

SUMMARY OF THE INVENTION

It has now been discovered that the above and other objects of the present invention may be accomplished in the following manner. Specifically, the present invention provides a dual wheel tug for moving aircraft on the ground while the motor of the airplane is off.

The tug device is assembled at the factory and includes a simple configuration that permits the device to be unfolded from the carton and assembled without tools in minutes. Because the device has a pair of drive wheels, the weight capability is significantly improved over my other designs. The present design also permits alignment in two distinct orientations, so that it is able to attach and tow aircraft at either the axle of the front wheel or the front strut. Two separate angles of attachment are needed and the present invention permits simple election between the two forms of attachment.

The tug device includes a power transmission column having a battery powered drill having a variable output, mounted on the upper end of the column and a drive wheel at the other end. A drive shaft engages the drill and a speed reducing gear box to drive the unit. The unit is steered by movement of a handle on the column. In the present invention, the steering function can be locked out, to give more stability of the device under load.

BRIEF DESCRIPTION OF THE DRAWINGS

For a more complete understanding of the invention, reference is hereby made to the drawings, in which:

FIG. 10 is a top view showing the trunions in position to engage an aircraft wheel;

FIG. 11 is an end view of the device on the right of FIG. 10;

FIG. 20 is a plan view of one embodiment of the present invention;

FIG. 21 is a perspective view showing the action of the lock as shown in FIG. 20;

DETAILED DESCRIPTION OF THE PREFERRED EMBODIMENT

Figure 1:
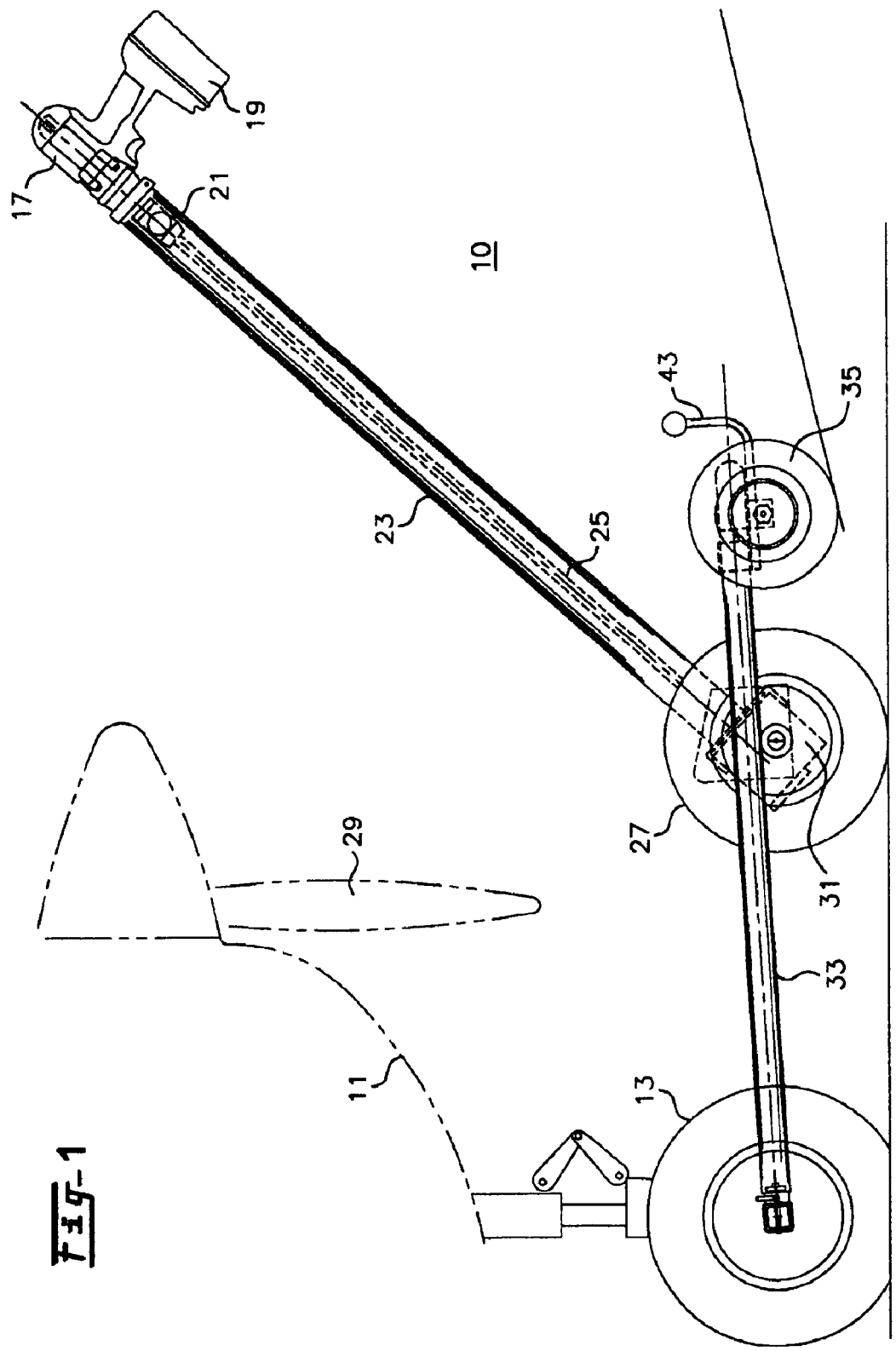
FIG. 1 is a side elevational view, partially cut away, showing the preferred embodiment in use with an aircraft shown in dot and dash lines.
Figure 2:
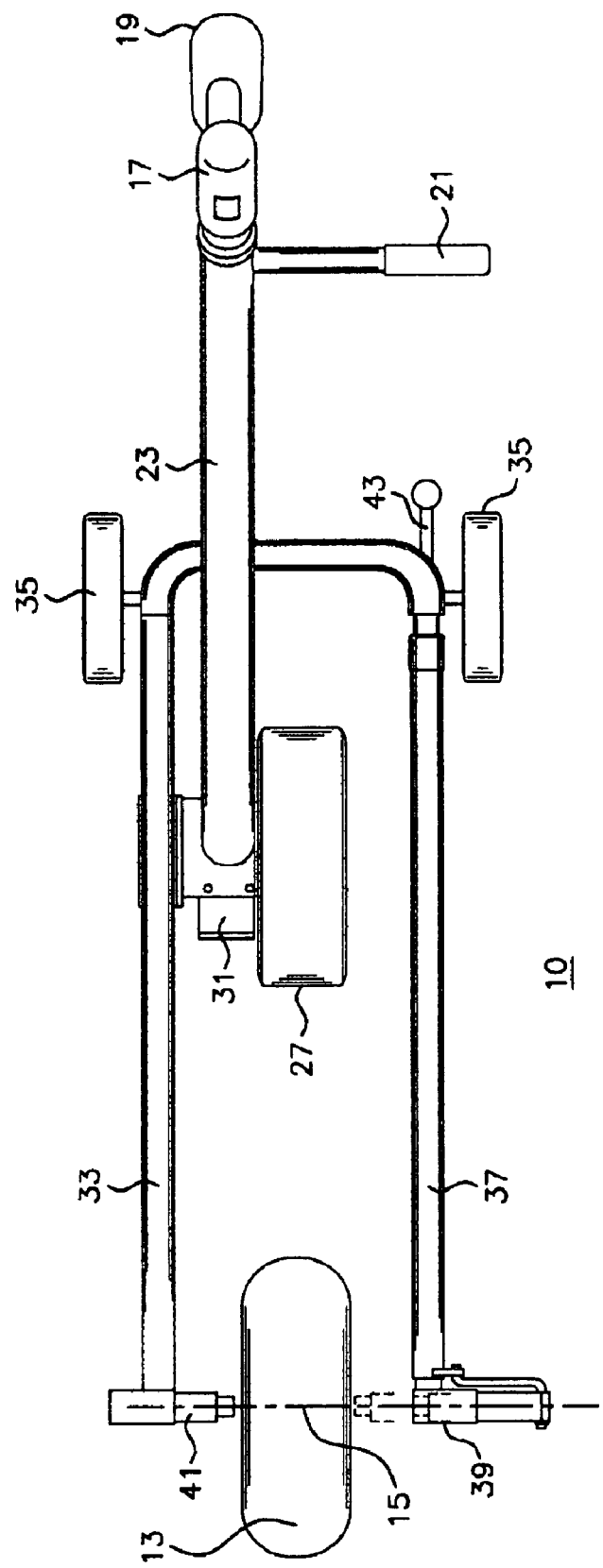
FIG. 2 is a top view of the device of FIG. 1.

As shown in the drawings, particularly FIGS. 1 and 2, the present invention provides a device 10 generally for use with an airplane 11 having a front wheel 13 supported on a front axle 15. Aircraft of any make or model weight less than about 3,000 pounds are suitable for use with the power tug of this invention. The tug includes a battery powered conventional electric drill 17, with rechargeable battery 19, for providing a suitable variable speed power source.

The preferred electric drill is a cordless 18-volt battery operated drill, having a quick release battery that snaps in place. A spare battery can be carried on the device.

The device includes a handle 19 for directional control of the device which is attached to the tubular power column 23. Column 23 includes a drive shaft 25, shown in dashed lines in FIG. 1, which communicates with drive wheel 27 to allow the device to be positioned near airplane 11 while propeller 29 is not operating, allowing a safe movement of plane 11. drive wheel is operated by drive shaft 25 and worm gear speed reducer 31, allowing drive wheel 27 to rotate in either direction, to push or pull aircraft 11.

A tubular frame 33 is attached to the drive shaft 25 and drive wheel 27 via simple connecting point, described below, which permits the unit to be separated into two major parts or components. Tubular frame 33 supports dolly wheels 35, which permit free wheeling movement of the unit when it is not attached to an aircraft.

Tubular frame 33 also includes a rotating engaging tube 37 for locking the tug to the airplane. Engaging tube 37 includes an engaging trunion 39 which is used to engage the aircraft axle 15 after fixed position trunion 41 has engaged the other side of axle 15. An aircraft engaging control lever 43 is foot operated to pivot engaging trunion 39 on to axle 15.

Figure 3:
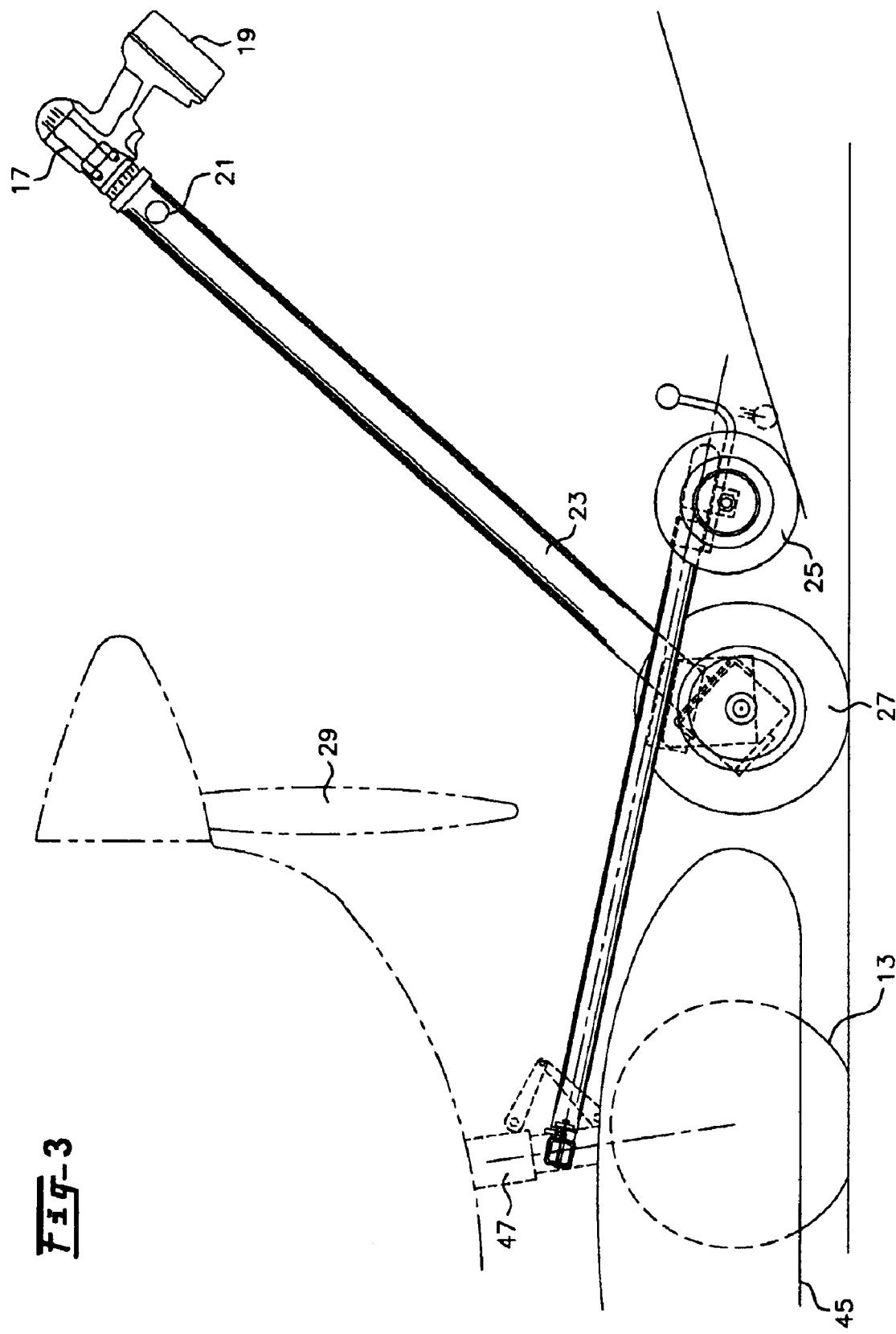
FIG. 3 is a side elevational view of the device of FIG. 1, in use with an alternative type of aircraft wheel.
Figure 4:
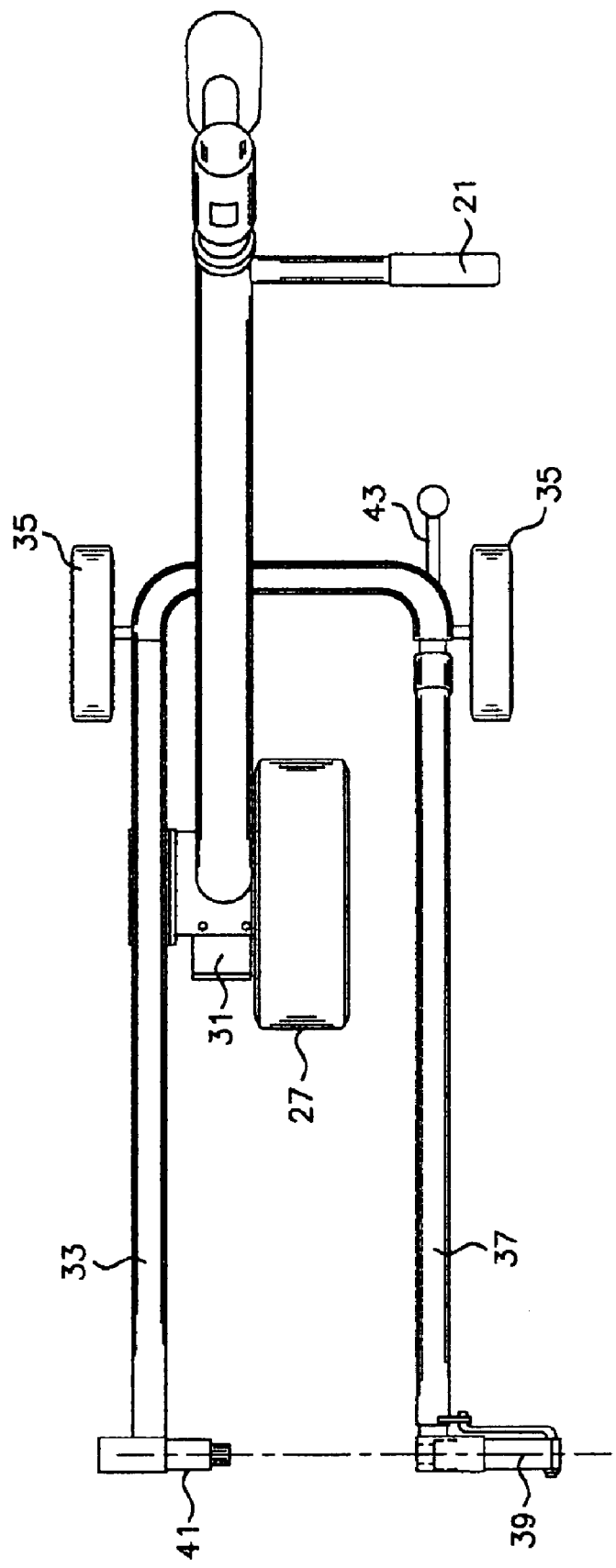
FIG. 4 is a top view of the device of FIG. 3.

FIGS. 3 and 4 illustrate an alternative use of the present invention with aircraft having enclosed front wheels 45 so that the engageable trunion 39 and fixed trunion 41 engage the airplane nose gear strut 47. tubular frame 33 is attached to the power column 23 and drive wheel 27 at a different angle or position, shown in FIG. 3.

Figure 5:
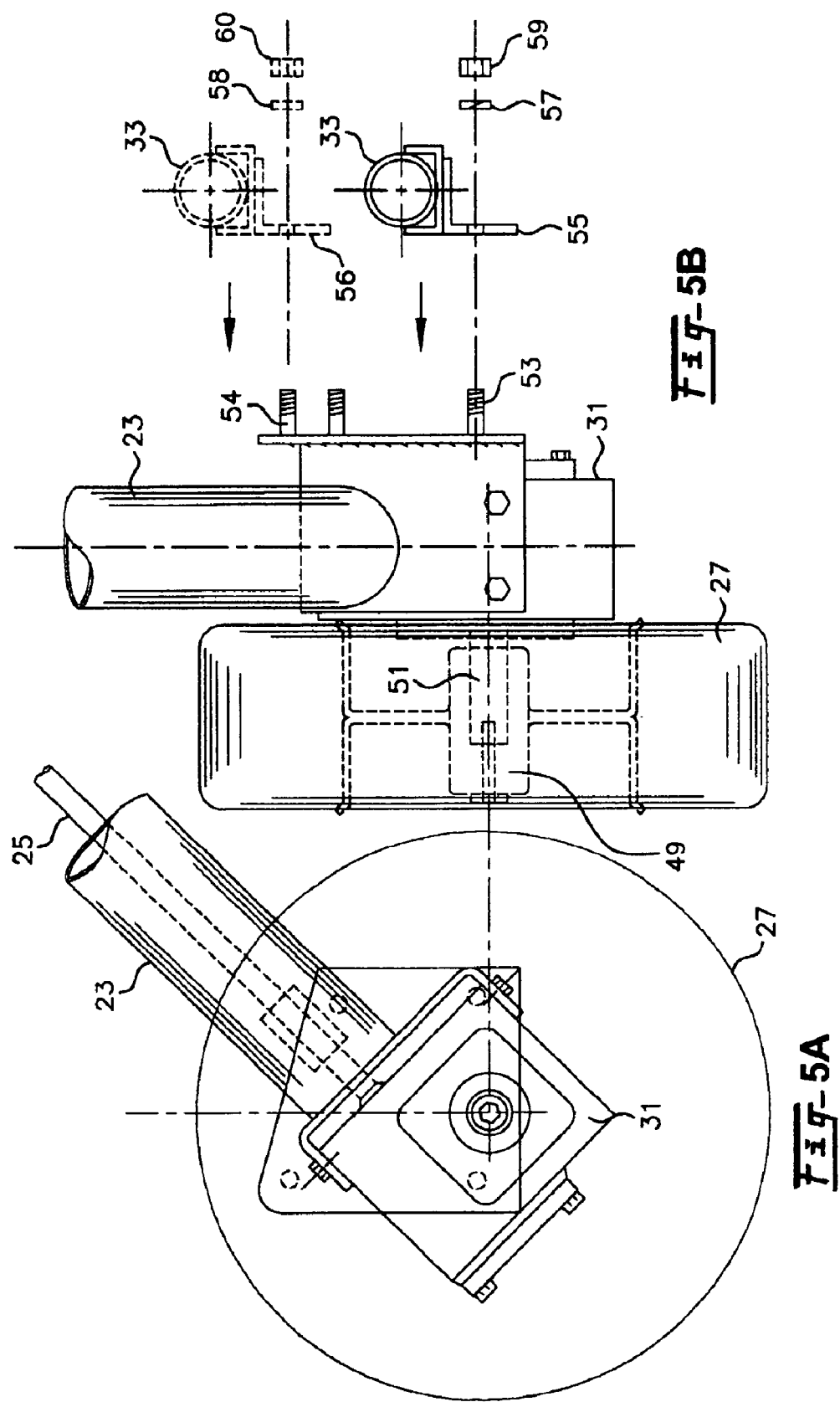
FIGS. 5A and 5B are detail views of the method of attachment of the frame to the power column in two configurations.
Figure 6:
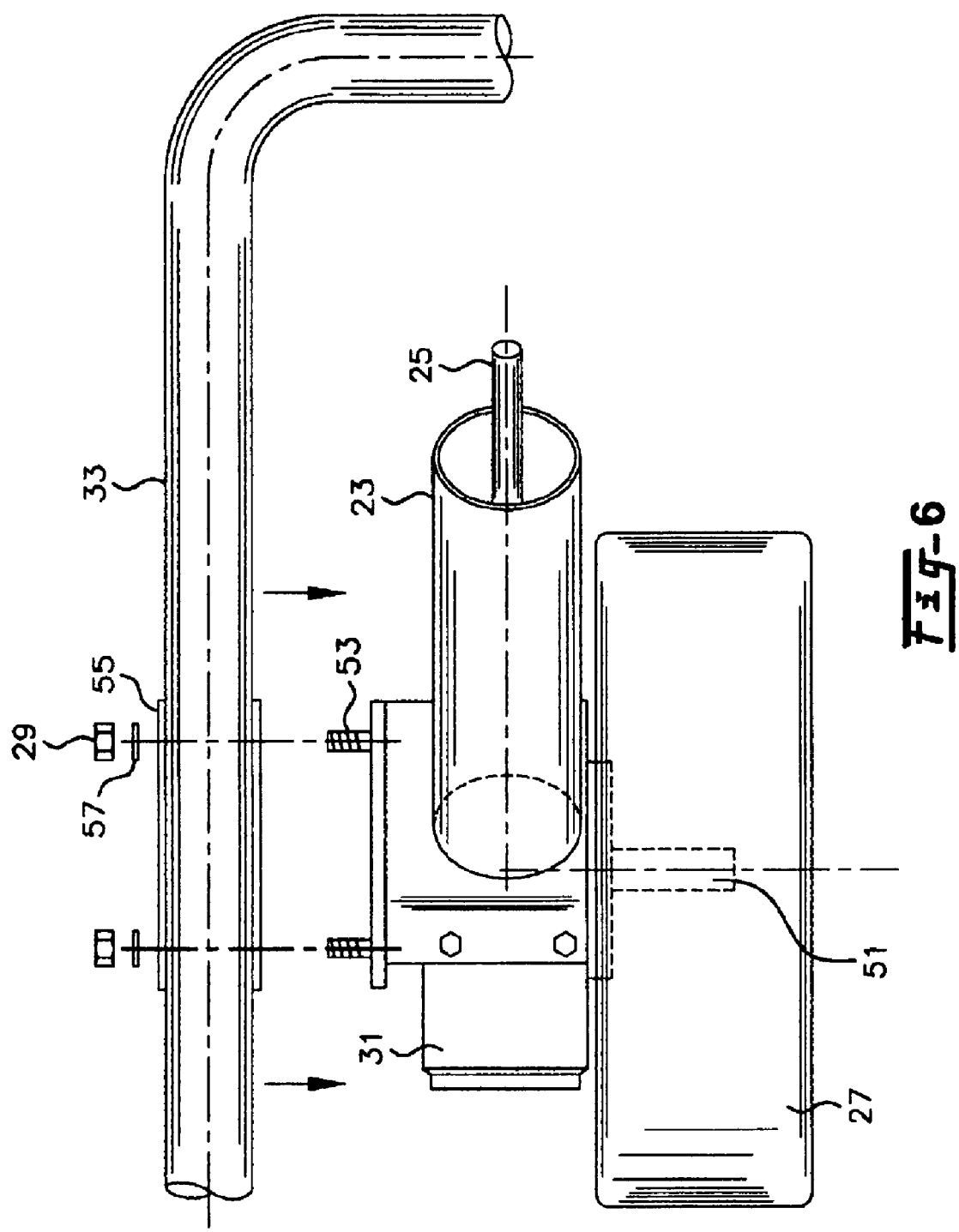
FIG. 6 is detail view illustrating the attachment of the frame to the power column in one configuration.

Frame 33 and power column 23 are joined using the attachment means shown in FIGS. 5A, 5B and FIG. 6. FIG. 5A is a side view of the power column 23 and worm gear box 31, also showing drive shaft 25. In FIG. 5B, drive wheel 27 includes a wheel to shaft attaching hub 49 and driven shaft 51. Worm gear box 31 is mounted on driven shaft 51, and the gear box 31 also includes bolts 53 for bracket 55 for attachment in the orientation shown in FIGS. 1 and 2, using lock washers 57 and hex nuts 59. Alternatively, shown in dot and dash line in FIG. 5B, bolts 54 are used with bracket 56, lock washer 58 and hex nut 60 for attachment in the orientation shown in FIGS. 3 and 4.

Figure 7:
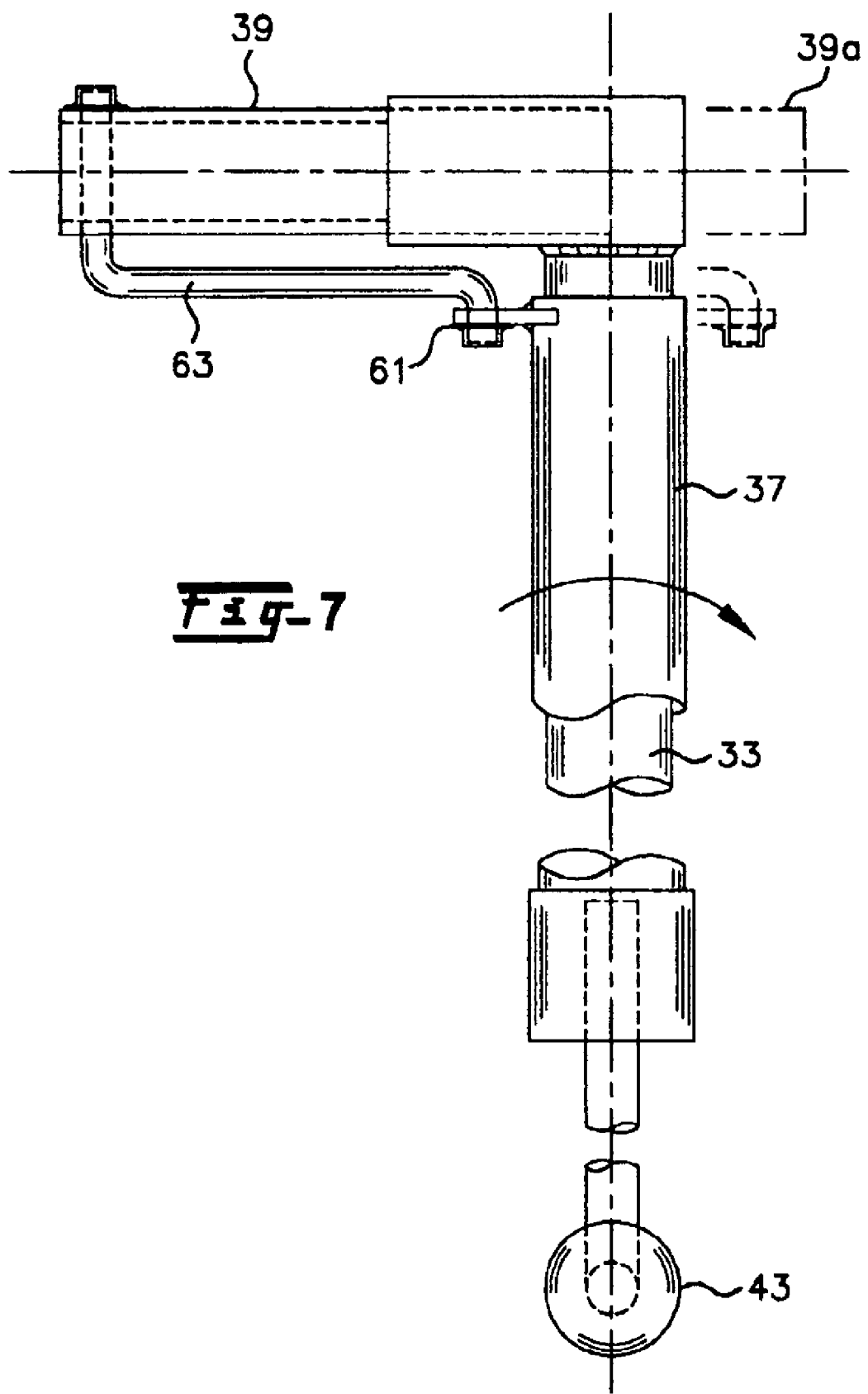
FIG. 7 is a detail view of the operation of the engagement trunion of the invention, with some components illustrated in dot and dash lines.
Figure 8:
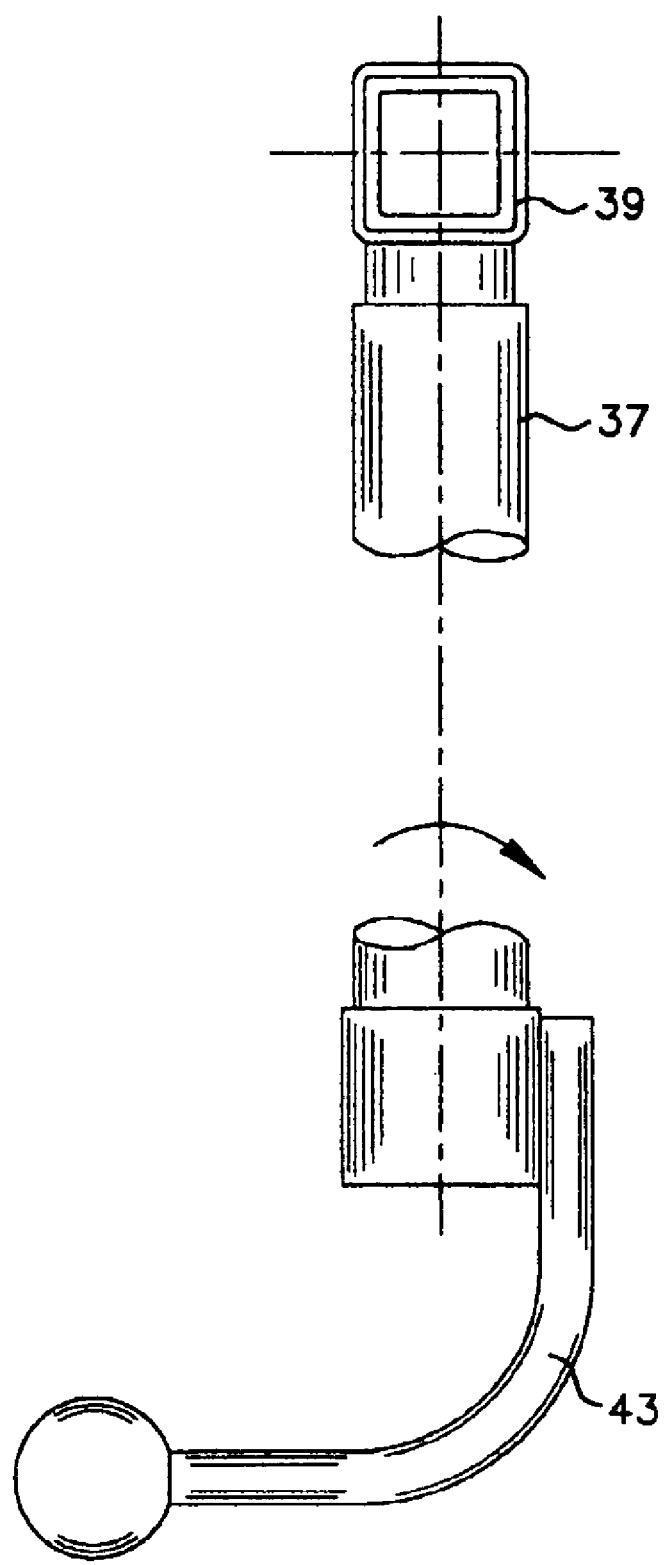
FIG. 8 is a detail view of the locking engagement mechanism for the engaging trunion.
Figure 9:
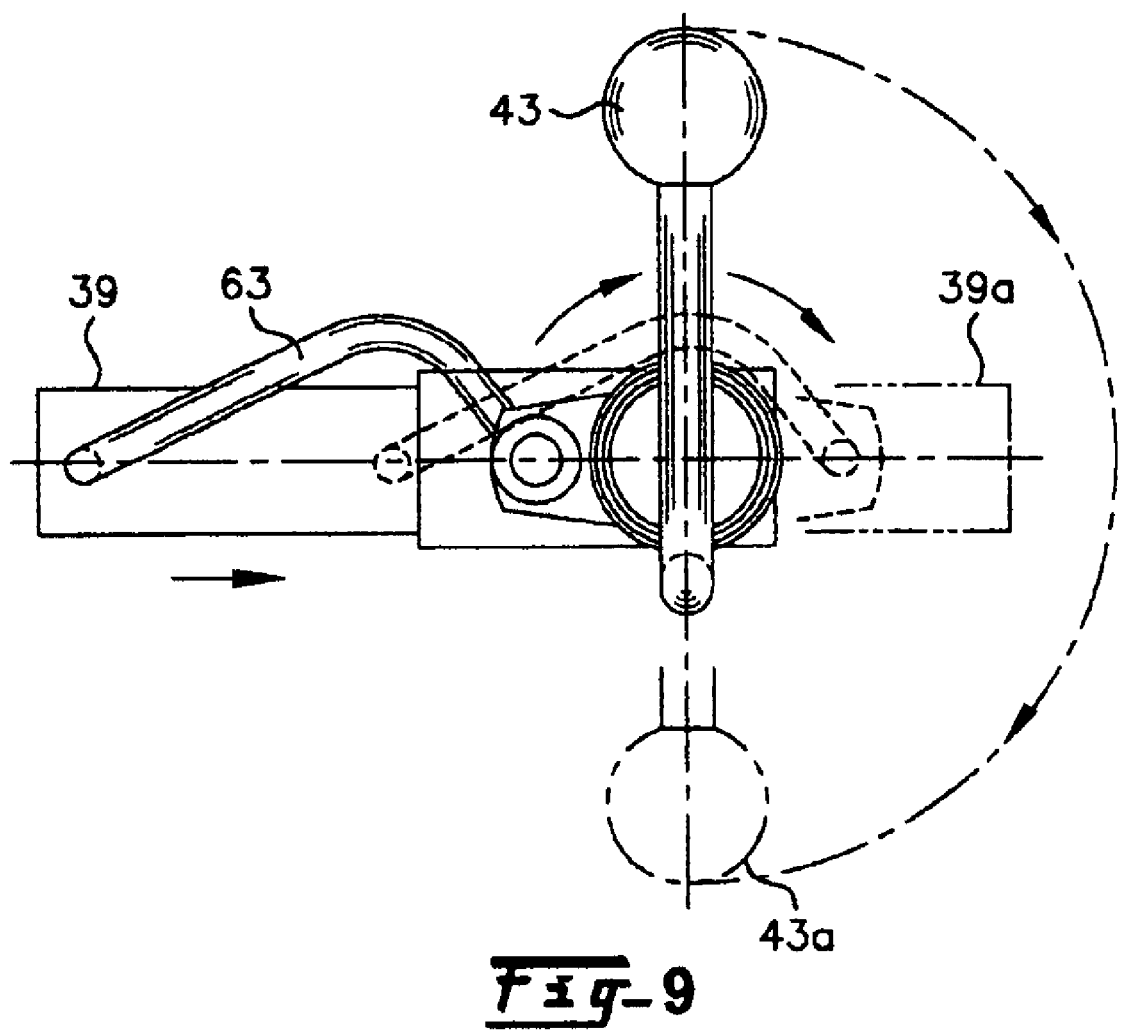
FIG. 9 is a side view illustrating the device shown in FIG. 8.

FIGS. 7, 8 and 9 illustrate the preferred engagement mechanism for attachment to the axle 15 or aircraft strut 47, depending on the particular airplane being towed by the tug device of this invention. Stationary tube 33 is enclosed by rotating engaging tube 37, shown in FIG. 7 as both are partially cut away. Engaging tube 37 includes a bracket 61 for holding link 63, which moves engaging trunion 39 about the axis of rotating engaging tube 37 for engagement with the axle 15 or strut 47 as described below.

FIG. 8 illustrates the way aircraft engaging control lever 43 is rotated to cause trunion 39 to be pivoted about that axis. FIG. 9 illustrates the control lever 43 in the engaged position, so that trunion 39 is, for example, engaged with axle 15, not shown in this figure. Movement of control lever 43a to the position shown in dot and dash lines moves link 63, and therefore trunion 39 away from the axle to the position shown, also seen as dot and dash lines in FIG. 7. The arrows illustrate the direction of movement of the components shown in these figures. Engagement is easy and secure, and an operator can use his or her foot to move control lever between the two positions.

FIG. 10 illustrates sliding engaging trunion 39 in greater detail and shows additional details of fixed position trunion 41, both of which are shown as square tubular stock 40 and 42 respectively. Adapters 65 are fitted on tubular stock 40 and 42. The airplane is then put in position, such as that of FIGS. 1 and 2, for example, so that axle 15 is first engaged by adapter 65 on stock 42, so that when sliding engaging trunion 39 is moved as described above, adapter 65 on tubular stock 40 also engages axle 15. FIG. 11 illustrates one end of adapter 65 mounted on stock 42, taken along lines 11—11 of FIG. 10. The unit is ready to move the aircraft.

Figure 12:
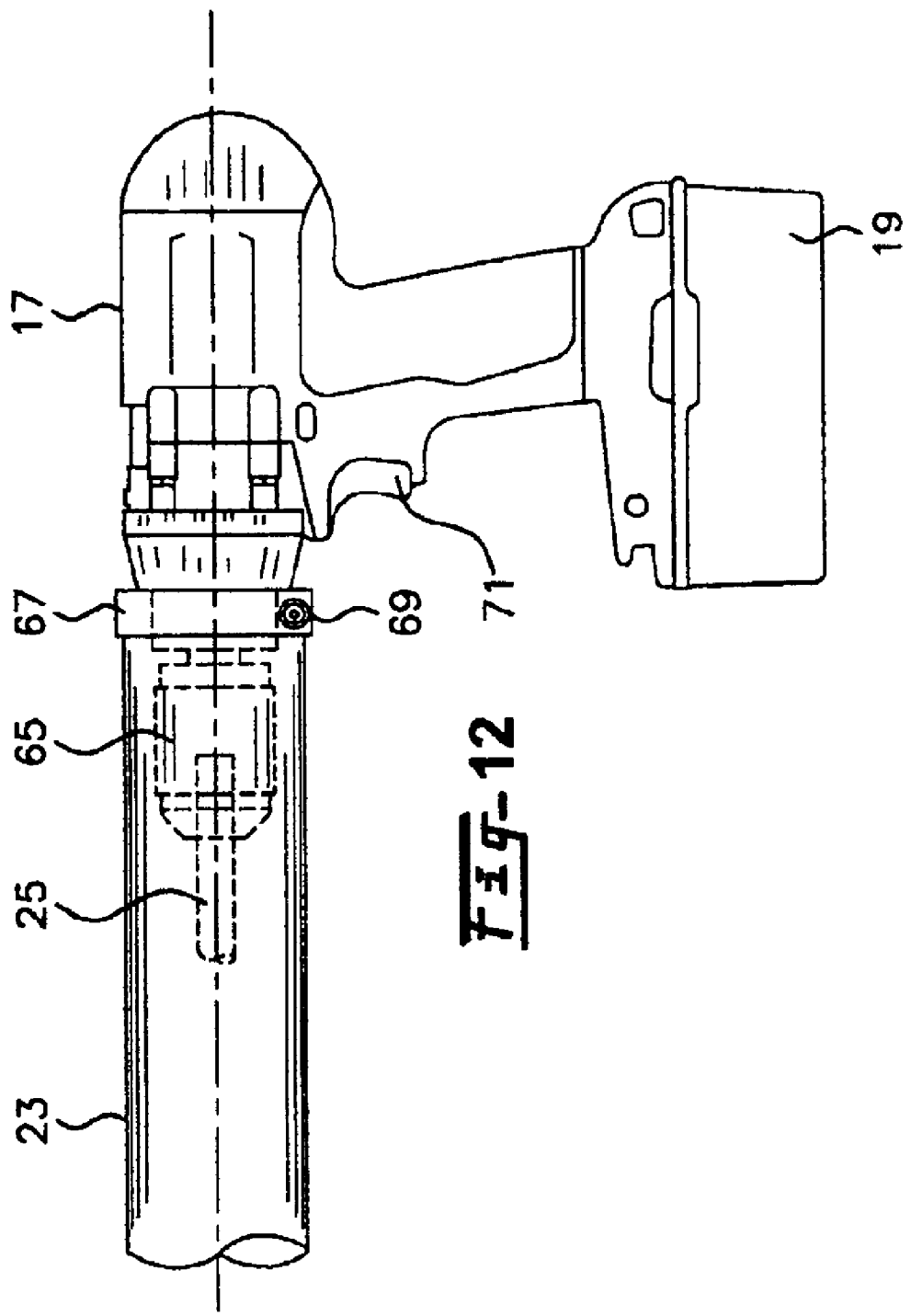
FIG. 12 is a side elevational view of the power element of the present invention.
Figure 13:
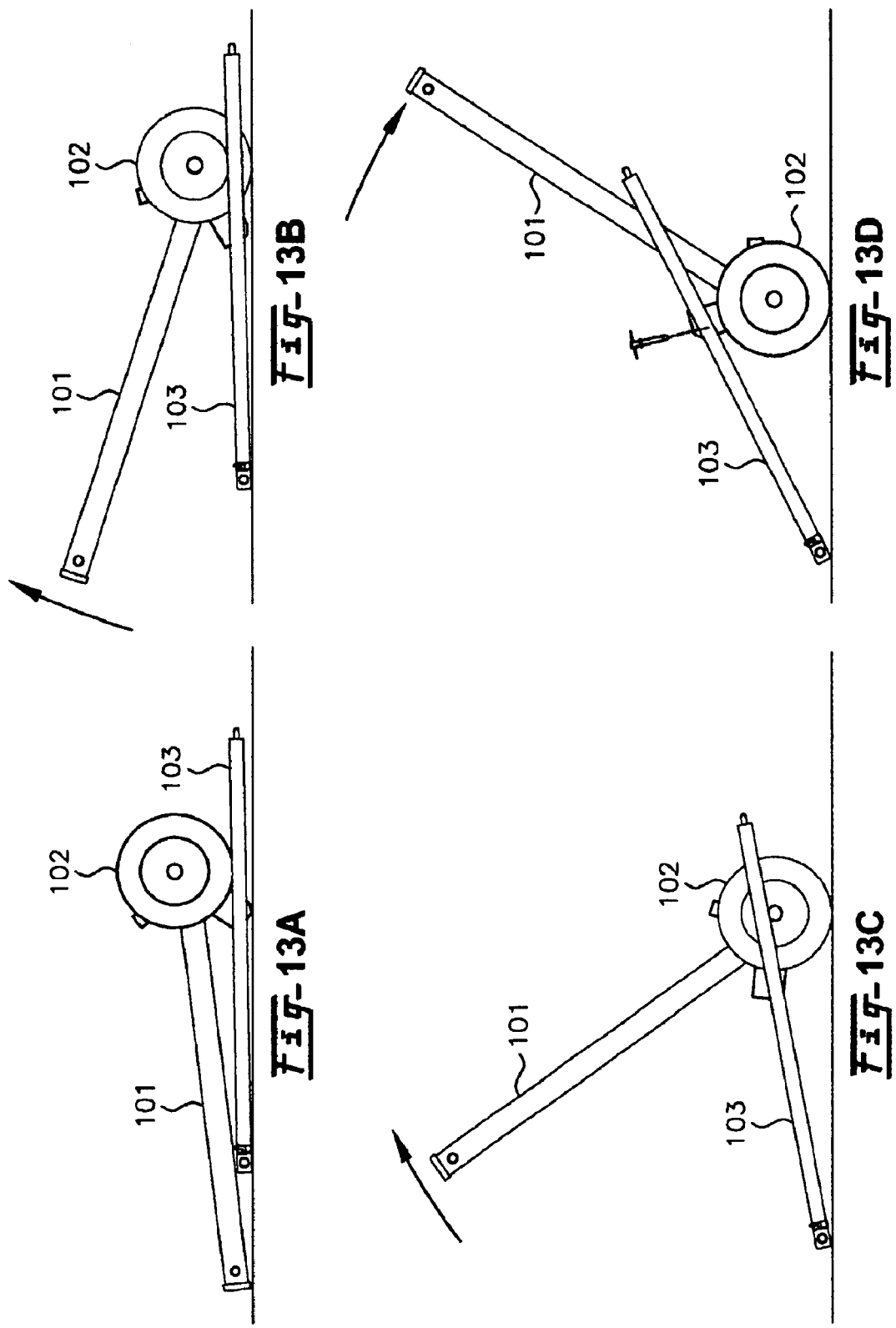
FIGS. 13a–13d are side elevational views showing the device of the present invention being unfolded from the shipping container to full assembly.

FIG. 12 illustrates the attachment and/or removal and replacement of cordless electric drill 17, if, for example, drill 17 should fail. In most commercially available drills, such as the ones shown here, battery 19 can be removed for recharging and, if desired, a spare battery could be used while charging the first such battery. It is important to note that the drill 17 may also be a corded drill connected to a power source. This feature permits movement of a large number of airplanes in a confined area where the tub does not have to go farther than a long extension or power cord. Drill 17 includes a drill chuck 65 which engages drive shaft 25, shown in dot and dash line in FIG. 12. A split collar 67 is welded to tubular power column 23 and fitted with a clamping screw 69 to mount the drill 17 firmly to the column 23. Pressure on trigger 71 causes shaft 25 to rotate in either direction, depending on the rotation direction 10 selected on drill 17, so that shaft 25 rotates to drive wheel 27 through a conventional worm gear speed reducer 31, seen in FIG. 1, for example.

Once the wheel 13 of an aircraft has been engaged, drill 17 moves drive wheel as desired, as fast or as slow as necessary, so that the aircraft can be brought to or from its parking location, or maintenance hanger. Handle 21 allows the device to be steered, providing excellent maneuverability.

The tug device of the present invention has been tested on a number of small aircraft. Tests have shown that the tug device is capable of moving a 3,000 pound airplane in and out of hangers with no strain or noticeable effort. One fully charged battery will continuously move an aircraft for at least ⅛ mile at two feet per second. There is no need to bend or stoop, since the control lever 43 is foot controlled, snapping from an engaged position to a disengaged position and back.

Since different airplane manufactures have different front wheel designs, the trunions are easily changed as desired in minutes. The cordless driver is intended to be a name brand drill that can be serviced at thousands of tool service centers, and can be removed and replaced in seconds. Since the drive wheel 27 is engaged with the gear box and drive shaft at all times, the drill acts as a positive brake for safe control on grades. Because there is full time engagement on the nose strut of the airplane, either on the nose wheel or the strut itself, there is no loss of control of the aircraft while in motion. The ability to attach and detach the frame to the power column allows for easier storage and for positioning the trunions for the two common forms of front airplane wheel assemblies gives the tug of this invention universal applicability.

Figure 14:
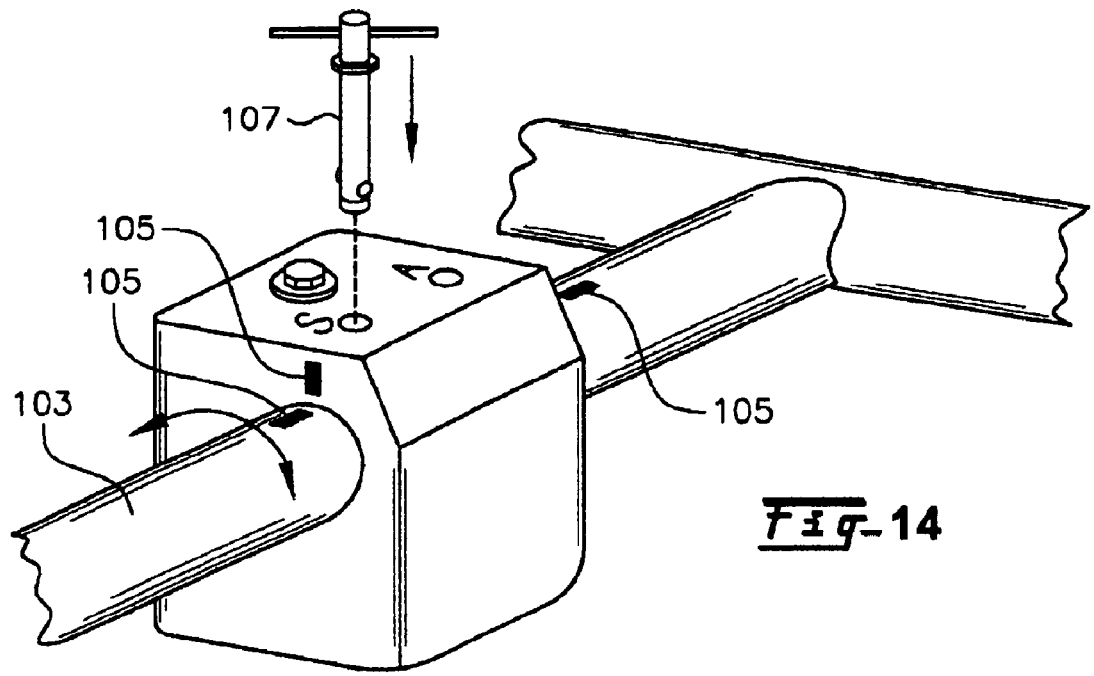
FIG. 14 is a perspective view showing insertion of the pin as shown in FIG. 13d.
Figure 15:
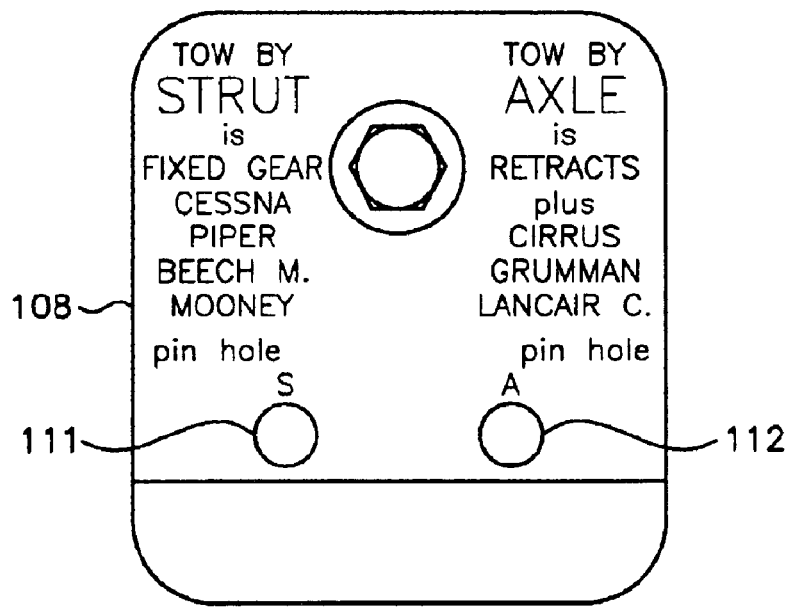
FIG. 15 is a plan view of the device showing two locations for insertion of the pin in FIG. 14.
Figure 16:
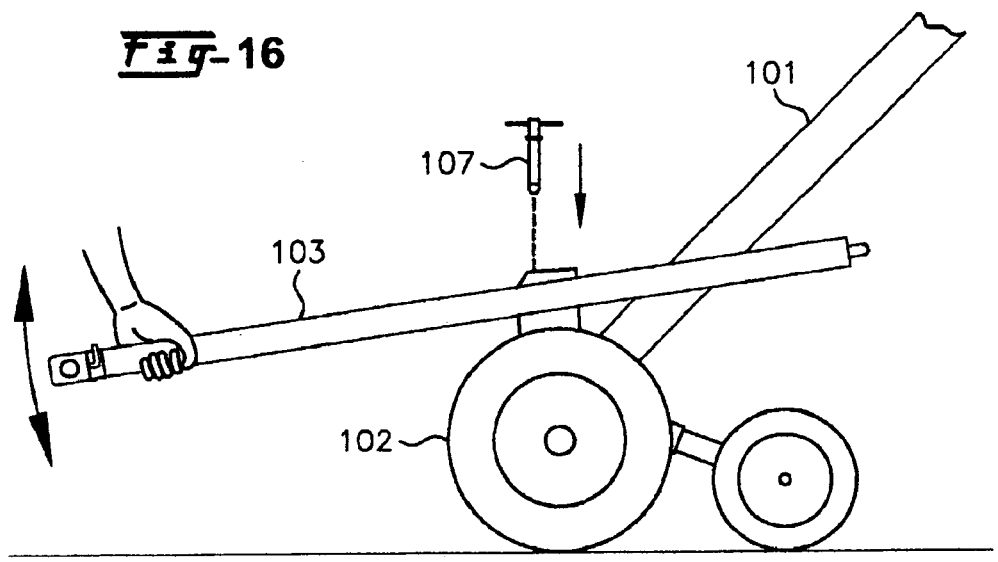
FIG. 16 is a side elevational view illustrating the step to be taken to insert the pin into the element shown in FIG. 15.
Figure 17:
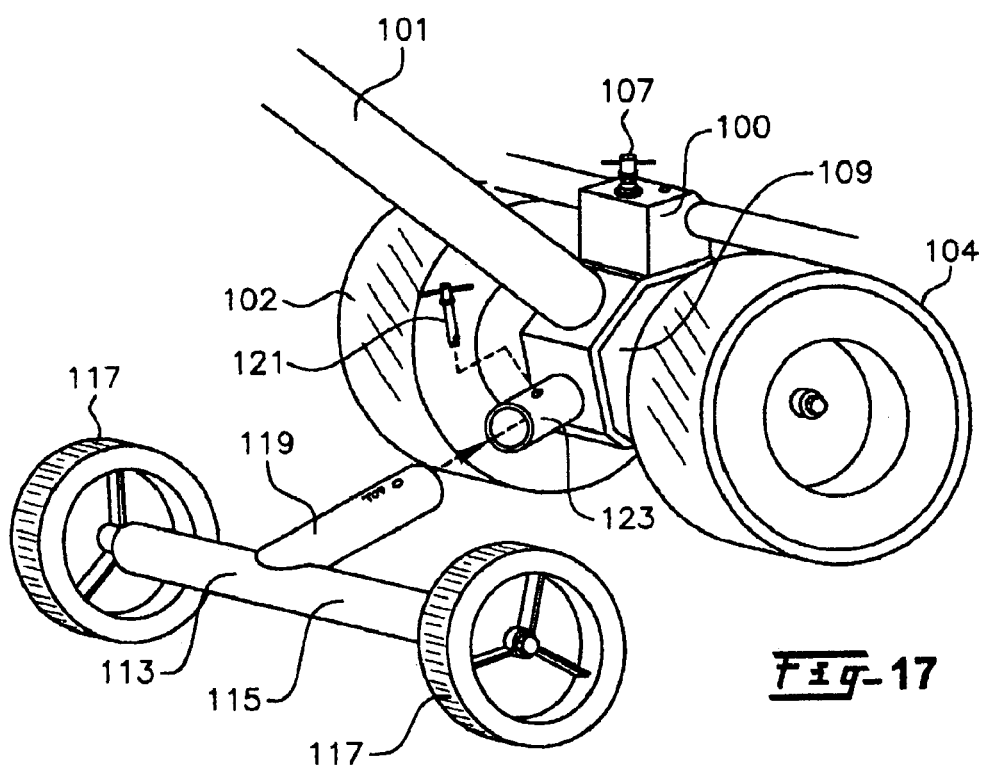
FIG. 17 is a perspective view showing the second component being installed in the device of this invention.

Turning now to FIGS. 13–23, the improved steerable feature of the present invention is shown, in which like numbers identify the same elements as in FIGS. 1–12 as described herein above. As noted above, the present invention comes in a carton in a folded condition as in FIG. 13a, and includes a handle 101 and an aircraft engaging member 103, along with the gearbox, drive shaft in handle 101. The wheels 102 and 104, shown better in FIG. 17, support the device. Handle 101 is lifted as shown by the arrows in FIGS. 13b and 13c to a final assembly position shown in FIG. 13d. Aircraft engaging member 103 is moved as shown in FIG. 14 to align marks 105 on member 103, and pin 107 is inserted into connecting box 108 into one of two pin holes, 111 and 112 in connecting box 108, so that the angle that the engaging member 103 makes with respect to the handle 101 is defined on one of two positions, depending on which form of aircraft is of interest. The pin 107 fits in either pin hole 111 or 112 as desired. FIG. 16 illustrates how the engaging member 103 is to be moved to permit alignment with either pin hole 111 or 112.

Next the dolly wheel assembly 113, which comprises an axle 115 and wheels 117 is positioned with mounting tube 119 in alignment with receiving tube 121 on gearbox 109, and short pin 121 is inserted in the hole 123 on receiving tube 123. The device is now ready for installation of the electric drill/drive motor 17 as described herein above.

Figure 18:
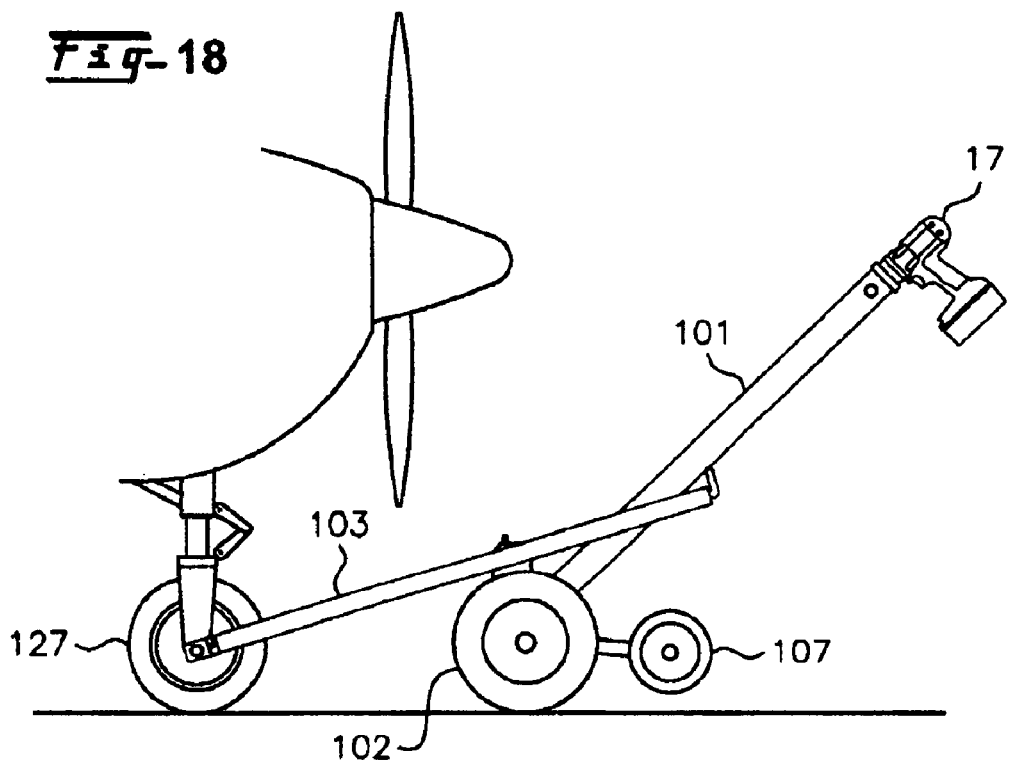
FIG. 18 is a side elevational view of the device of this invention in use with one kind of aircraft.
Figure 19:
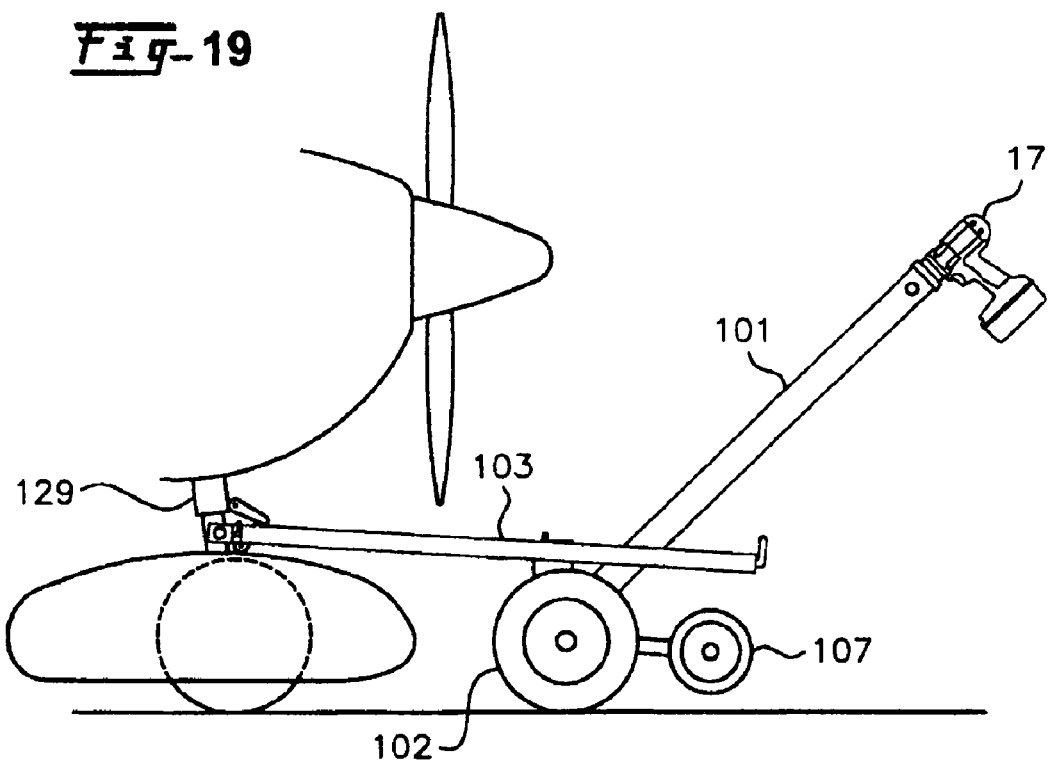
FIG. 19 is a side elevational view of the device of this invention in use with another kind of aircraft.

FIGS. 18 and 19 illustrate the two towing positions for the device of this invention, where the aircraft engaging member 103 engages the axle of wheel 127 in FIG. 18 or the strut 129 in FIG. 19. In both cases, dolly wheels 117 remain about two inches or so above the ground.

Near the top of handle 101 and below electric drill 17 is a twist action steering release bar 131 which is rotated in one direction 133 (counterclockwise here) to lock the steering mechanism and in the other direction 135 (clockwise here) to release the lock and permit the device to be turned, as shown in FIG. 20 to steer the aircraft. The handle grip bar 131 will hold its unlock or release position when the dot (preferably colored red) 137 is aligned with the line (again preferably colored red) 139 as illustrated in FIG. 21.

FIG. 20 illustrates a situation when the engaging member 103 has engaged a wheel 127 of an aircraft and the release bar 131 has been moved to the unlocked position 135 and dot 137 is aligned with line 139. It should be noted that wheels 117 are above ground by the aforementioned two inches or so, and this permits the wheels 102 and 104 can pivot about a shaft inside gearbox 109 from a far left to a far right angle, making a total angle of steering travel of 56° as shown by arrow 141.

Figure 22:
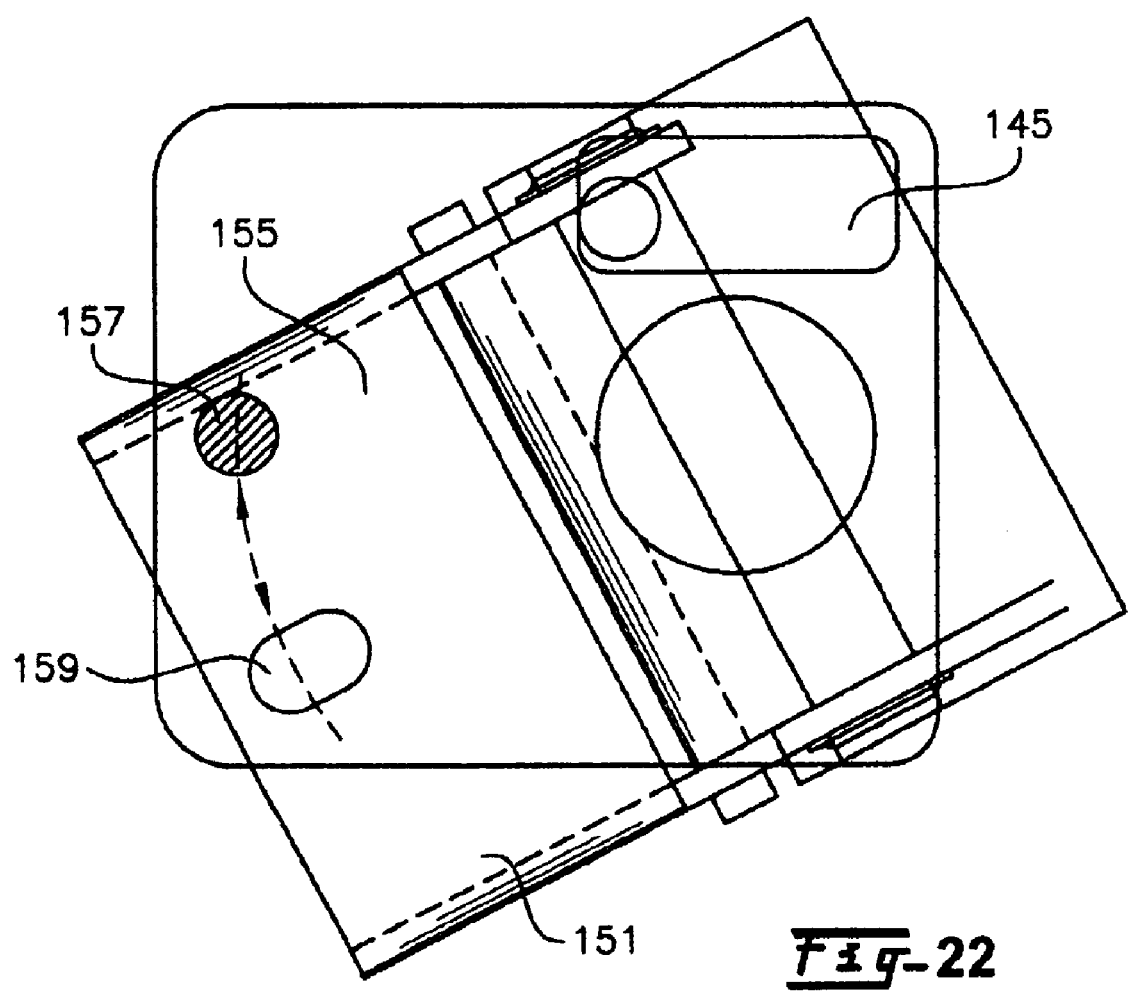
FIG. 22 is a plan view of details of the steering mechanism.
Figure 23:
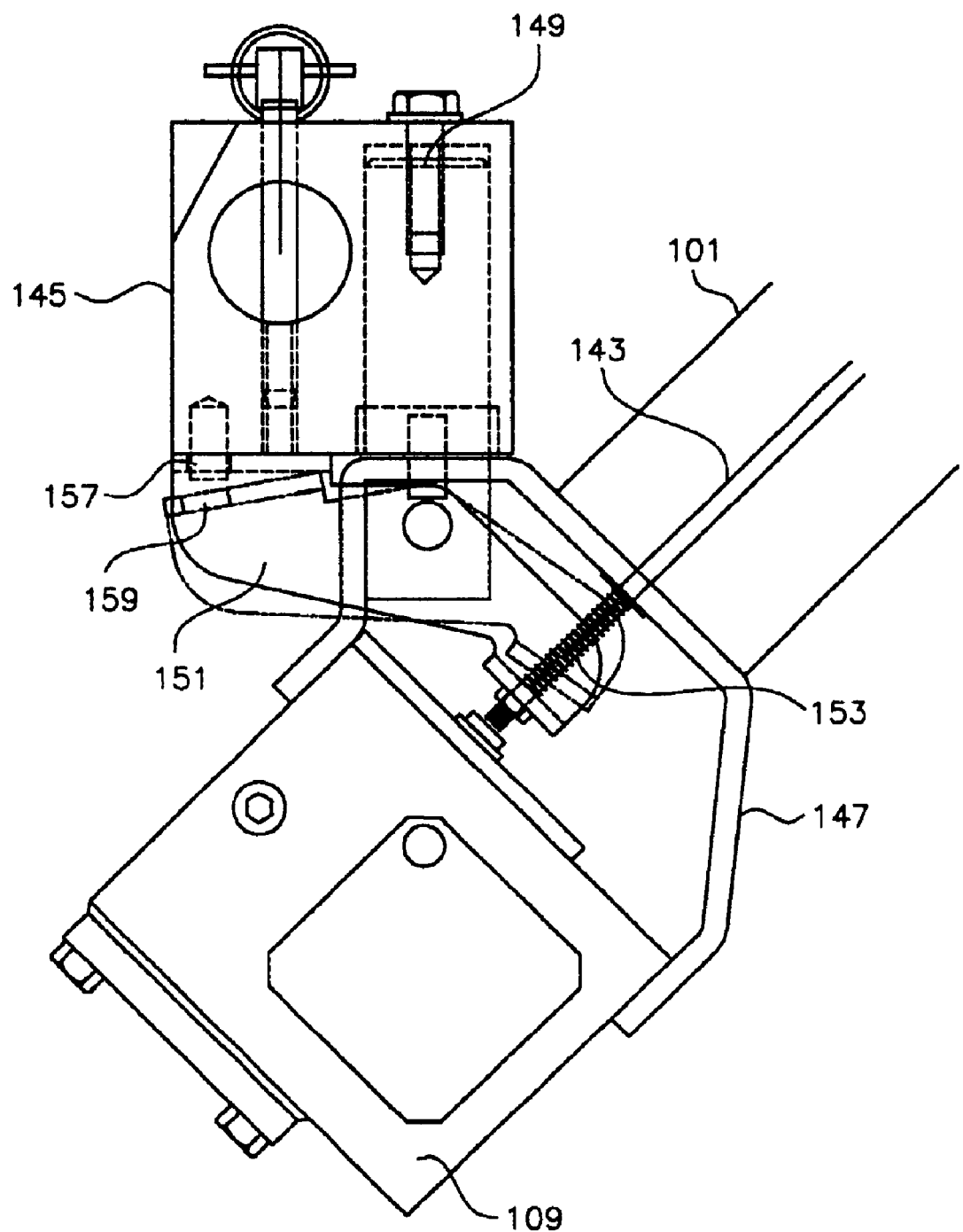
FIG. 23 is a detail view of the lock and unlock mechanism of FIG. 22 and shown in place in the device of this invention.

FIGS. 21–23 illustrate the steering unlock/lock mechanism that permits the present invention to operate in the steering mode. The handle 101 (which includes the same drive shaft 25 that is shown, inter alia, in FIG. 1 and engages the gears in the gearbox 109 in the same manner as shaft 25 engages gearbox 27 in FIG. 5A) also includes an additional rod 143, abutting gear box 109 for stability. Rod 143 is attached to release bar 131 at its other end and is mounted off to the side of the center of handle 101 to avoid interference with the drive shaft 25. When release bar is moved as described above, rod 143 rotates about its axis. Connecting cube 145 is mounted on the lower frame 147, like lower frame 33 of FIG. 6. Connecting cube 145 is adapted to pivot in the vertical axis about steering post 149 unless it is locked, and pivots in the horizontal axis on the iron member of lower frame 147 to which it is attached, to permit steering.

A latch 151 is mounted on the lower end of rod 143 and pivots about the axis of rod 143 when the release bar 131 is moved as described above. When latch 151 pivots, its outer end tilts in a vertical plane. Return spring 153 adds a biasing force on latch 151 so that the latch slides across the bottom face 155 of connecting cube 145, shown in FIG. 21. Lock pin 157 extends down from face 155. Latch 151 includes a hole 159, seen in FIG. 22, that engages lock pin 157 when the release bar 131 is twisted in the locking direction 133. When release bar 131 is twisted in the other direction 135, latch 151 tilts off the lock pin 157 and permits horizontal movement of the wheels (about the axis with respect to the frame, thus allowing the device to be steered.

In operation, the improved steerable power tug for small aircraft has shown significant advances in movement of such small planes on the ground. With the steerable feature, maneuvering is significantly improved. Moreover, it has been surprisingly discovered that heavier and larger aircraft can be moved with the tug of this invention. In one test, a Cesna Citation, a twin engine plane weighing about 4,000 pounds, was moved easily, whereas the non-steerable device was designed for aircraft up to about 3,000 pounds.

While particular embodiments of the present invention have been illustrated and described, it is not intended to limit the invention, except as defined by the following claims.

What is claimed is:

1. In a tug device for ground moving small aircraft having at least one front wheel, said device including a frame, a handle for connecting a drive wheel driven by a drill having a variable output and connected to the drive wheel by a drive shaft and gear box, said frame having an engaging member for attachment to said aircraft, the improvement comprising:

a pair of ground engaging drive wheels mounted on an axle attached to said frame and positioned on both sides of said gear box, said gear box having connecting box for selectively aligning the handle for a first position and a second position with respect to the ground to permit engagement with two different elevations on said aircraft;

dolly wheels removably attached to said device, said dolly wheels being positioned to permit movement of said device without said drive wheels contacting said ground, said dolly wheels being further positioned to be raised above said ground when said device is engaged with said aircraft in said two different elevations;

alignment marks on said connecting box for insuring said handle is aligned in said first and second positions to drive said drive wheels in a straight line direction; and a vertical pivot shaft supporting said connecting box on said frame to permit said handle to pivot said wheels about said pivot shaft and steer said device.

2. The device of claim 1, wherein said device further includes a locking latch for selectively preventing and permitting pivot of said drive wheels about said pivot shaft.

3. The device of claim 2, wherein said locking latch comprises a release bar on the upper end of said handle, a rod connected at one end to said release bar and connected to a latch element at its other end, and said connecting box includes a latch element engaging member for selectively engaging said latch to permit and prevent movement of said wheels about said pivot shaft.

4. The device of claim 3, wherein said latch element includes a biasing element for biasing said latch element in a position for engagement of said latch element with said latch element engaging member, said latch element being positioned to tilt out of engagement with said latch element engaging member upon movement of said release bar in one direction and tilt into engagement upon movement of said release bar in an opposite direction.

5. The device of claim 1, wherein said dolly wheels include an axle supporting said dolly wheels and a tube member extending from said axle and said gear box includes a tube receiving member extending toward said tube member for engagement and mounting said dolly wheels on said gear box, said tube member and said tube receiving member each including pin receiving holes alignable to receive a pin to fasten said tube member to said tube receiving member.

6. The device of claim 1, wherein said handle is pivotable about said drive wheel axel from an operating position where said handle aligns said engaging member for attachment to said aircraft and a storage position where said handle is approximately parallel to said ground.

7. In a tug device for ground moving small aircraft having at least one front wheel, said device including a frame, a handle for connecting a drive wheel driven by a drill having a variable output and connected to the drive wheel by a drive shaft and gear box, said frame having an engaging member for attachment to said aircraft, the improvement comprising:

a pair of ground engaging drive wheel means for driving said device, said wheel means being mounted on an axle attached to said frame and positioned on both sides of said gear box, said gear box having connecting box means for selectively aligning the handle for a first position and a second position with respect to the ground to permit engagement with two different elevations on said aircraft;

dolly wheel means for moving said device, said dolly wheel means being removably attached to said device, said dolly wheel means being positioned to permit movement of said device without said drive wheel means contacting said ground, said dolly wheel means being further positioned to be raised above said ground when said device is engaged with said aircraft in said two different elevations;

alignment means on said connecting box for insuring said handle is aligned in said first and second positions to drive said drive wheel means in a straight line direction; and vertical pivot shaft means for supporting said connecting box means on said frame to permit said handle to pivot said drive wheel means about said pivot shaft means and steer said device.

8. The device of claim 7, wherein said device further includes a locking latch means for selectively preventing and permitting pivot of said drive wheel means about said pivot shaft means.

9. The device of claim 8, wherein said locking latch means comprises a release bar on the upper end of said handle, a rod connected at one end to said release bar and connected to a latch element at its other end, and said connecting box includes a latch element engaging member for selectively engaging said latch to permit and prevent movement of said drive wheel means about said pivot shaft means.

10. The device of claim 9, wherein said latch element includes a biasing element for biasing said latch element in a position for engagement of said latch element with said latch element engaging member, said latch element being positioned to tilt out of engagement with said latch element engaging member upon movement of said release bar in one direction and tilt into engagement upon movement of said release bar in an opposite direction.

11. The device of claim 7, wherein said dolly wheel means include an axle supporting said dolly wheel means and a tube member extending from said axle and said gear box includes a tube receiving member extending toward said tube member for engagement and mounting said dolly wheels on said gear box, said tube member and said tube receiving member each including pin receiving holes alignable to receive a pin to fasten said tube member to said tube receiving member.

12. The device of claim 7, wherein said handle is pivotable about said drive wheel means axle from an operating position where said handle aligns said engaging member for attachment to said aircraft and a storage position where said handle is approximately parallel to said ground.

13. In a tug device for ground moving small aircraft having at least one front wheel, said device including a frame, a handle for connecting a drive wheel driven by a drill having a variable output and connected to the drive wheel by a drive shaft and gear box, said frame having an engaging member for attachment to said aircraft, the improvement comprising:

a pair of ground engaging drive wheel means for driving said device, said wheel means being mounted on an axle attached to said frame and positioned on both sides of said gear box, said gear box having connecting box means for selectively aligning the handle for a first position and a second position with respect to the ground to permit engagement with two different elevations on said aircraft;

dolly wheel means for moving said device, said dolly wheel means being removably attached to said device, said dolly wheel means being positioned to permit movement of said device without said drive wheel means contacting said ground, said dolly wheel means being further positioned to be raised above said ground when said device is engaged with said aircraft in said two different elevations, said dolly wheels include an axle supporting said dolly wheels and a tube member extending from said axle and said gear box includes a tube receiving member extending toward said tube member for engagement and mounting said dolly wheels on said gear box, said tube member and said tube receiving member each including pin receiving holes alignable to receive a pin to fasten said tube member to said tube receiving member;

alignment means on said connecting box for insuring said handle is aligned in said first and second positions to drive said drive wheel means in a straight line direction, said handle being pivotable about said drive wheel axle from an operating position where said handle aligns said engaging member for attachment to said aircraft and a storage position where said handle is approximately parallel to said ground;

vertical pivot shaft means for supporting said connecting box means on said frame to permit said handle to pivot said drive wheel means about said pivot shaft means and steer said device; and a locking latch for selectively preventing and permitting pivot of said drive wheels about said pivot shaft, said locking latch comprising a release bar on the upper end of said handle, a rod connected at one end to said release bar and connected to a latch element at its other end, and said connecting box includes a latch element engaging member for selectively engaging said latch to permit and prevent movement of said wheels about said pivot shaft.

14. The device of claim 13, wherein said latch element includes a biasing element for biasing said latch element in a position for engagement of said latch element with said latch element engaging member, said latch element being positioned to tilt out of engagement with said latch element engaging member upon movement of said release bar in one direction and tilt into engagement upon movement of said release bar in an opposite direction.

* * * * *